(12) United States Patent
Scholtes

(10) Patent No.: US 10,138,745 B2
(45) Date of Patent: Nov. 27, 2018

(54) SEALING SYSTEM WITH TWO ROWS OF COMPLEMENTARY SEALING ELEMENTS

(71) Applicant: SAFRAN AIRCRAFT ENGINES, Paris (FR)

(72) Inventor: Christophe Scholtes, Vaux-le-Penil (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 351 days.

(21) Appl. No.: 15/034,728

(22) PCT Filed: Nov. 12, 2014

(86) PCT No.: PCT/FR2014/052872
§ 371 (c)(1),
(2) Date: May 5, 2016

(87) PCT Pub. No.: WO2015/071585
PCT Pub. Date: May 21, 2015

(65) Prior Publication Data
US 2016/0319684 A1    Nov. 3, 2016

(30) Foreign Application Priority Data
Nov. 14, 2013   (FR) ...................................... 13 61122

(51) Int. Cl.
*F01D 11/00* (2006.01)
*F01D 11/02* (2006.01)
(Continued)

(52) U.S. Cl.
CPC ............ *F01D 11/001* (2013.01); *F01D 11/02* (2013.01); *F01D 11/025* (2013.01);
(Continued)

(58) Field of Classification Search
CPC ...... F01D 11/001; F01D 11/02; F01D 11/025; F04D 29/083; F16J 15/445; F16J 15/4472; F05D 2220/32
See application file for complete search history.

(56) References Cited

U.S. PATENT DOCUMENTS

| | | | |
|---|---|---|---|
| 3,303,997 A | | 2/1967 | Welch et al. |
| 4,645,424 A | * | 2/1987 | Peters .................... F01D 5/026 |
| | | | 415/173.7 |

(Continued)

FOREIGN PATENT DOCUMENTS

| | | |
|---|---|---|
| DE | 199 60 895 A1 | 6/2001 |
| EP | 2 412 933 A2 | 2/2012 |

(Continued)

OTHER PUBLICATIONS

French Search Report dated Aug. 5, 2014 in FR 13 61122 Filed Nov. 14, 2013.

(Continued)

*Primary Examiner* — Igor Kershteyn
(74) *Attorney, Agent, or Firm* — Oblon, McClelland, Maier & Neustadt, L.L.P.

(57) ABSTRACT

A sealing system in a cavity under the stator of a turbomachine flow path, the cavity being located between a root of a vane of the stator and a complementary rotor device, the root including two surfaces each provided with an abradable coating, the rotor device being provided with a first and a second sealing element, arranged facing the first and the second surface respectively, the first surface and the first sealing element forming a first sealing pair and delimiting a first leakage section between them, the second surface and the second sealing element forming a second sealing pair and delimiting a second leakage section between them, one of the two pairs tending towards a minimum leakage section (Continued)

when the other tends towards a maximum leakage section, and vice versa.

9 Claims, 2 Drawing Sheets

(51) Int. Cl.
    *F04D 29/08*     (2006.01)
    *F16J 15/447*     (2006.01)
    *F16J 15/44*     (2006.01)

(52) U.S. Cl.
    CPC .......... *F04D 29/083* (2013.01); *F16J 15/445* (2013.01); *F16J 15/4472* (2013.01); *F05D 2220/32* (2013.01)

(56) References Cited

U.S. PATENT DOCUMENTS

| | | | | |
|---|---|---|---|---|
| 4,659,289 A * | 4/1987 | Kalogeros | ............. | F01D 5/3015 415/173.7 |
| 4,822,244 A * | 4/1989 | Maier | ..................... | F01D 5/082 415/115 |
| 5,503,528 A * | 4/1996 | Glezer | .................. | F01D 11/001 415/115 |
| 5,833,244 A * | 11/1998 | Salt | ....................... | F01D 11/001 277/421 |
| 7,430,802 B2 * | 10/2008 | Tiemann | ............... | F01D 5/3015 29/889.22 |
| 7,520,718 B2 * | 4/2009 | Engle | .................... | F01D 5/3015 415/173.7 |
| 8,740,554 B2 * | 6/2014 | Virkler | .................. | F01D 5/3015 415/173.7 |
| 9,309,783 B2 * | 4/2016 | Nallam | .................... | F01D 11/02 |
| 2005/0116425 A1 | 6/2005 | Blatchford et al. | | |
| 2007/0059158 A1 * | 3/2007 | Alvanos | .................. | F01D 5/081 415/115 |
| 2008/0112800 A1 | 5/2008 | Blatchford et al. | | |
| 2012/0027575 A1 | 2/2012 | Manzoori | | |
| 2014/0086727 A1 | 3/2014 | Xu | | |

FOREIGN PATENT DOCUMENTS

FR           1476987           4/1967
GB           2 408 548 A        6/2005

OTHER PUBLICATIONS

International Search Report dated Feb. 12, 2015 in PCT/FR14/52872 Filed Nov. 12, 2014.

* cited by examiner

SEALING SYSTEM WITH TWO ROWS OF COMPLEMENTARY SEALING ELEMENTS

TECHNICAL DOMAIN AND PRIOR ART

This invention relates to the domain of turbomachines, and more particularly the domain of turbomachine compressors and nozzles.

The invention is applicable to any type of land or aeronautical turbomachines, and particularly aircraft turbomachines such as turbojets and turboprops. More preferably, it is applicable to a twin shaft turbofan.

STATE OF PRIOR ART

A turbomachine comprises for example a compressor with a plurality of compression stages each composed of an annular row of mobile (rotor) blades mounted on a shell of the turbomachine and a stator mounted on an external annular case of the turbomachine.

A compressor stator may be composed of a ring or it may be broken down into sectors (i.e. it comprises a plurality of angular sectors connected end to end circumferentially around the longitudinal axis of the compressor). Throughout this application, the term "sector" refers to any annular portion of a structure with an angular extent covering an angle of less than or equal to 360°, for example or more specifically a stator sector.

Each stator sector comprises an outer shell and an inner shell arranged coaxially one inside the other and one (or several) vane(s) extending radially between these shells and connected to them through their radial end(s).

To allow operation of a compressor, there is a clearance at each stage between the stator and the hub, forming a cavity under the stator. In an operating compressor, the pressure increases along the upstream-to-downstream direction. Consequently, a leakage flow generally circulates in this cavity, along the direction from downstream-to-upstream of the stator, passing under the radially inner end of the inner shell. The existence of such a leakage flow is often qualified as a "recirculation under stator phenomenon".

The recirculation under stator phenomenon disturbs the main gas flow in the turbomachine, and in particular it modifies the flow conditions upstream from the vanes. Thus, this phenomenon is a significant factor in reducing operability and performance losses of a compressor.

One solution to counter the recirculation under stator phenomenon has already been disclosed consisting of installing sealing elements supported by the rotor shell and arranged facing an abradable coating layer supported by the stator. This combination of a row of sealing elements and an abradable coating is called a labyrinth seal or more simply a "labyrinth".

It is thus possible to reduce the leakage section and therefore the gas leakage flow under the inner shell of the stator.

One difficulty is related to the fact that the rotor and the case move independently of each other under the effect of relatively high mechanical and thermal deformations during a conventional engine mission. Consequently, the leakage section varies during engine missions. At some points of a mission, the leakage section becomes sufficiently high so that there is a non-negligible impact on compressor performances.

For example, loss of performance may be as high as 0.5% to 1% on points of the engine mission at high speed.

It is thus desirable to improve solutions to avoid the negative impact of the recirculation under stator phenomenon in order to improve compressor performances.

PRESENTATION OF THE INVENTION

The invention thus relates to a sealing system in a cavity under a stator sector of a turbomachine flow path, comprising a stator sector and a stator device, the cavity being located between a blade root of the stator sector and a complementary rotor device, the root comprising a first surface provided at least partially with an abradable coating, the rotor device being provided with at least a first sealing element facing the first surface, the first surface and the first sealing element forming a first sealing pair and delimiting a first leakage section between them.

According to the invention, the root comprises a second surface provided with at least a partial abradable coating, the rotor device being provided with at least a second sealing element facing the second surface, the second surface and the second sealing element forming a second sealing pair and delimiting a second leakage section between them, the first sealing pair tending towards a minimum leakage section when the second pair tends towards a corresponding maximum leakage section, and the first leakage pair tending towards a maximum leakage section when the second pair tends towards a minimum leakage section during an engine mission. Finally, the first and second sealing pairs are at an axial spacing from each other.

The invention can thus compensate the relative spacing of the first sealing pair by a reduction in the leakage flow through the second sealing pair. Therefore, the invention can advantageously make use of strains applicable to the stator and the rotor of a turbomachine during its operation. More precisely, with the axial spacing between sealing pairs, the skew effect that applies to the stator and the rotor relative to each other is judiciously used to obtain the required compensation between leakage flows.

The invention may also advantageously comprise an axial wall, for example in the form of a ring sector. The effect of this axial wall is to cause a pressure loss in the leakage flow that improves the global performances of the turbomachine.

The invention also has the advantage that it does not cause any additional assembly constraint that does not already exist.

Advantageously, the first surface is an internal surface of the root and the second surface is an external surface of the root.

In one particular embodiment, the radius of curvature of the first surface is less than the radius of curvature of the second surface.

The first surface may for example face a longitudinal axis of the turbomachine, opposite the second surface.

Preferably, the second surface belongs to an axial wall that projects axially from a body of the root, such that the second surface is radially located under a platform of the rotor device, and the first surface is arranged on the root body, while being at least partially overlapped radially by a platform of the stator sector.

In a first embodiment of the invention, the second surface forms part of the axial wall of the root, the axial wall extending along the upstream direction. The invention can thus be implemented in a low or high pressure compressor flow path. This configuration advantageously makes use of the skew between the stator and the rotor during operation of the turbomachine when the invention is implemented in a compressor.

In a first embodiment of the invention, the second surface forms part of the axial wall of the root, the axial wall extending towards the downstream direction. The invention can thus be implemented in a low or high pressure turbine flow path. This configuration advantageously makes use of the skew between the stator and the rotor during operation of the turbomachine when the invention is implemented in a turbine.

The invention also applies to a rotor device comprising at least a first sealing element extending towards the outside of the turbomachine forming a first group of sealing elements, and at least one second sealing element facing the longitudinal axis and forming a second group of sealing elements, the rotor device being configured to form a sealing system like that described previously, in combination with a stator sector, the first and second group of sealing elements being at an axial spacing from each other.

Throughout this disclosure, it should be understood that a sealing element oriented outwards is arranged such that the radial distance between its peak and the longitudinal axis of the turbomachine is more than the radial distance between its root and this axis, which is the contrary of a sealing element facing the longitudinal axis.

The invention also relates to a stator sector comprising a blade with a root that comprises a first surface provided with at least a partial abradable coating and faces a longitudinal axis of the turbomachine, and a second surface provided with at least a partial abradable coating and facing the outer part of the turbomachine, the stator sector being configured to form a sealing system like that previously disclosed in combination with a rotor device. Furthermore, the two abradable coatings are at an axial spacing from each other.

The invention also relates to a turbomachine in which a rotor device and a stator sector like that disclosed above jointly form a sealing system.

BRIEF DESCRIPTION OF THE DRAWINGS

The invention will be better understood after reading the detailed description given below, of non-limitative example embodiments of the invention and an examination of the diagrammatic and partial figures of the appended drawing, on which.

Furthermore, the different parts shown in the figures are not all necessarily at the same scale to make figures more easily understandable.

DETAILED PRESENTATION OF PARTICULAR EMBODIMENTS

Figure 1:
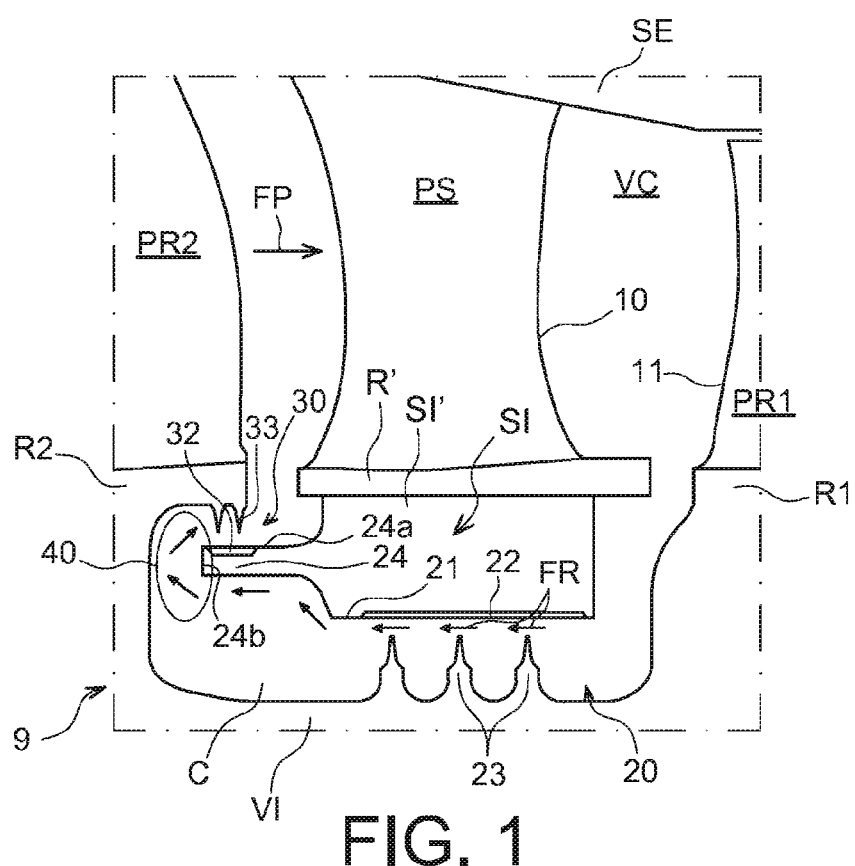
FIG. 1 very diagrammatically shows an example of a compressor comprising a sealing system under a stator sector according to the invention.

Throughout this disclosure, the terms upstream and downstream should be understood with reference to a main normal gas flow direction FP for a turbomachine (see FIG. 1). Furthermore, the turbomachine axis is the longitudinal axis of symmetry of the turbomachine. The axial direction is the direction of the turbomachine axis, and the radial direction is a direction perpendicular to this axis. Furthermore, unless mentioned otherwise, the adjectives and adverbs axial, radial, axially and radially are used with reference to the axial and radial directions mentioned above. Furthermore, unless mentioned otherwise, the adjectives inner and outer are used with reference to a radial direction such that the inner part or inner face (i.e. radially inner) of an element is closer to the turbomachine axis than the outer part or face (i.e. radially outer) of this element. In the appended figures, the outer side is at the top and the inner side is at the bottom.

FIG. 1 shows a partial diagram of an example turbomachine compressor showing a stator sector 10 and a rotor element 11 jointly provided with a sealing system 9 according to the invention, in other words a leakage flow limitation system.

The stator sector 10 comprises an outer shell SE, a vane PS and an inner shell SI forming the root of the stator. The vane PS is installed inside the shell SE. The inner shell SI is installed at the inner end of the vane PS, coaxially with the shell SE.

The rotor element 11 comprises an upstream rotor platform R2 supporting a vane PR2 and a downstream rotor platform R1, supporting a vane PR1. The upstream platform R2 and the downstream platform R1 are connected to each other by a rotor shell VI.

As will be disclosed at the end of the description, this system can be transposed for use in a turbine with very few changes.

The inner shell SI is located axially between the platforms R1 and R2, and radially under platform R' of the stator sector 10.

The inner shell SI comprises an inner surface 21. The space located radially between the shell SI and the shell VI of the rotor defines a cavity C under the stator.

The inner shell SI in the example shown comprises an axial ledge or wall 24 that extends axially upstream from the compressor, and therefore in this case a forward ledge. The ledge 24 thus projects axially from a body SI' of the root SI, to extend beyond the platform R' along the axial direction, and be partially covered by the platform R2.

In this case, the ledge 24 is in the form of a ring sector extending in the angular direction, for example along the angular dimension of the corresponding stator root (in this case, the stator sector 10).

The rotor element 11 and the stator sector 10 are formed such that the ledge 24 is at least partially surrounded by the platform R2 and the shell VI on its three faces, the outer face 24a, the forward face 24b and the inner face upstream from the cavity C.

The inner surface 21 is provided with an abradable coating layer 22. Three sealing elements 23 forming a first group of sealing elements are in this case located on the shell VI, facing the abradable coating 22. The coating 22 and the sealing elements 23 thus form a first sealing pair 20, also referred to as a first labyrinth seal. The abradable coating 22 is located radially under the platform R' of the sector 10, preferably without projecting axially beyond the platform. The same applies for the first surface 21 arranged on the root body (SI') and on which the abradable coating 22 is applied.

In this case the outer face 24a of the forward ledge 24 is provided with an abradable coating 32. In this case, two sealing elements 33 forming a second group of sealing elements are located on the shell VI, facing the abradable coating 32. The coating 32 and the sealing elements 33 thus form a second sealing pair 30, also referred to as a second labyrinth seal. The abradable coating 32 is axially separated from the platform R' of the sector 10, such that there is no overlap along the axial direction. Furthermore, the second surface 24a coated with the abradable coating 32 is partly radially under the platform R2 of the rotor device 11.

The first sealing pair 20 and the second sealing pair 30 are at an axial spacing from each other. In other words, there is no overlap zone between these two pairs 20, 30, along the axial direction, nor is there an axial overlap zone between the two groups of sealing elements 23, 33, nor an axial overlap zone between the two abradable coatings 22, 32.

In the embodiment shown, the number of sealing elements 23, 33 in the first and second groups of sealing elements is not limitative, and may for example vary from one to ten for a given pair 20 or 30.

In FIG. 1, the arrow FP shows the global flow direction in the example of the flow path VC in a turbomachine compressor. In a compressor, the static air pressure increases as air is entrained towards the downstream side of the compressor. Thus, the air pressure in the flow path is higher close to the downstream vane PR1 than it is close to the upstream vane PR2. A leakage flow FR then forms in the cavity C. The general direction of this flow FR is shown in FIG. 1 in the example of a compressor.

During an engine mission, the rotor element 11 and the stator sector 10 are each affected by thermal and mechanical strains inherent to each of them.

Thus, these two assemblies 10 and 11 move relative to each other.

A radial separation of the inner shell SI of the stator sector 10 from the rotor shell VI causes:
  firstly, an increase in the gap between the sealing elements 23 and the abradable coating 22 and therefore the leakage section through the first sealing pair 20,
  secondly, a reduction in the gap between the sealing elements 33 and the abradable coating 32 and therefore the leakage section through the second pair 30.

Consequently, when the gap between the abradable coating 22 and the sealing elements 23 is maximum, the gap between the abradable coating 32 and the sealing elements 33 is minimum.

Conversely, when the shells SI and VI move radially towards each other, the leakage section in the first sealing pair 20 will reduce while the leakage section in the second pair 30 will increase.

Consequently, the instantaneous leakage section of each of pairs 20 and 30 varies between a minimum leakage section and a maximum leakage section respectively.

Therefore the smallest of the leakage sections in the pairs 20 and 30 determines the global leakage flow of the flow path FR. The two pairs 20 and 30 have a complementary effect in limiting the leakage flow.

Furthermore, as shown in FIG. 1, the leakage flow FR changes direction when passing through the zone 40, in other words at the forward surface 24b. This direction change induces turbulences and therefore a pressure loss in the flow FR, in other words a dissipation of its mechanical energy. This pressure loss in the leakage flow FR is beneficial for the main flow FP and therefore for the compressor performance.

Furthermore, as will be disclosed below, this sealing system 9 makes use of a stator skew phenomenon under the effect of aerodynamic and mechanical forces in the flow path to reduce the minimum gap at high speed, particularly due to the axial gap between the two sealing pairs 20, 30.

Figure 2A:
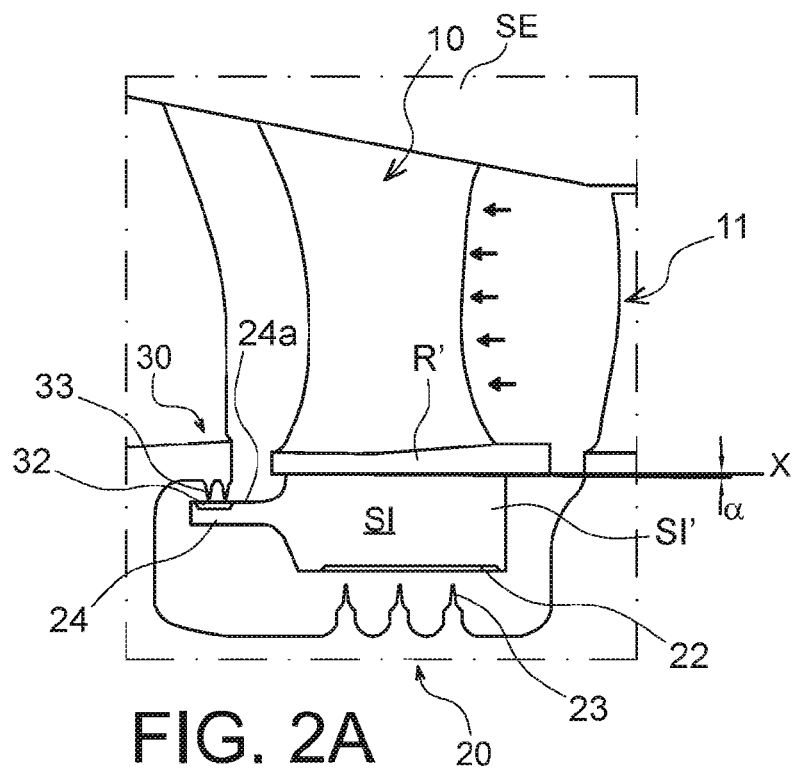
FIGS. 2A and 2B show two situations in operation of the compressor showing example deformations of the stator sector.

The example in FIG. 2A shows the relative position of the assemblies 10 and 11 during a phase in which engine speed is increasing. In this case, the stator sector 10 has expanded radially outwards, this time under the effect of temperature rise due to the increase in the flow pressure and under the mechanical incidence of the air flow under pressure. On the other hand, the temperature rise is lower in the rotor element 11 that has a higher thermal inertia and therefore its deformation is lower.

Furthermore, the stator sector 10 is affected by aerodynamic forces in the flow path VC from the right to left due to an increase in the pressure in the compressor from upstream to downstream.

Consequently, the stator sector 10 is affected by an angular displacement a relative to a longitudinal direction X in line with an axis of the turbomachine, this displacement currently being referred to as "skew". This angular displacement a leads to a movement of the ledge 24 outwards from the turbomachine, and therefore the abradable coating 32 moving closer to the sealing elements 33. In this configuration, the first sealing pair 20 has a maximum leakage section while the second sealing pair 30 has a minimum gap. Due to the axial gap between the two pairs 20, 30, a small angular movement α is sufficient to cause a significant reduction in the leakage flow through the second pair 30.

Figure 2B:
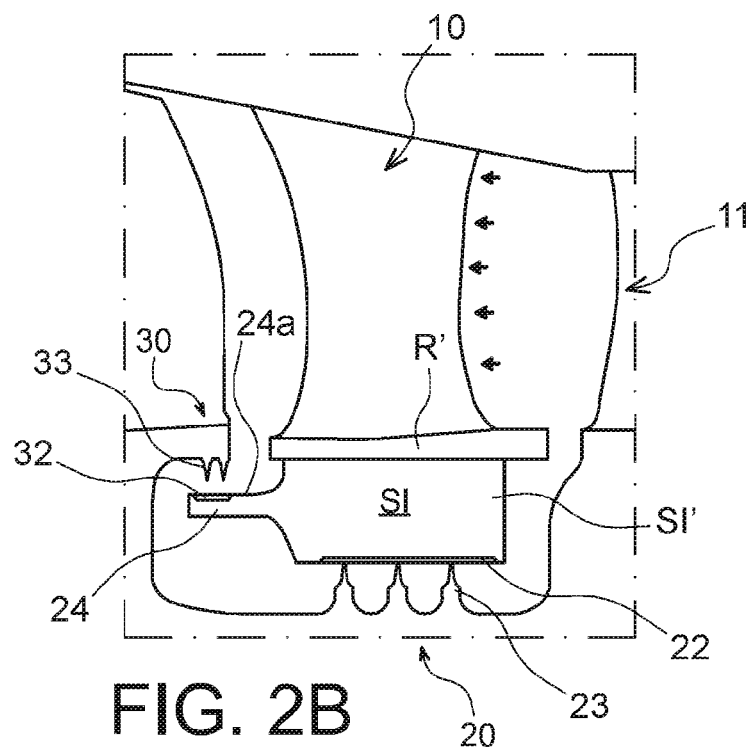

The example in FIG. 2B shows the same assemblies 10 and 11 during a phase to reduce the engine speed. The stator sector 10 is then cooled and contracts while the rotor is still in a heated state under the effect of the thermal inertia. The stator shell SI then moves closer to the rotor shell VI, and the first sealing pair 20 has a minimum leakage section while the second sealing pair 30 has a maximum gap.

The sealing system 9 in a compressor, disclosed with reference to FIGS. 1 and 2A and 2B, may be transposed to low or high pressure turbines.

Unlike compressors, the static pressure in the flow path VT in a turbine in which the stator is called the nozzle reduces from upstream to downstream and the leakage flow in the cavity under a turbine stator is along the upstream to downstream direction, in other words along the inverse direction to the leakage flow under a compressor stator.

Thus, in one embodiment (not shown) of a sealing system under a turbine stator, the nozzle root SI is provided with a ledge with a configuration similar to that of the ledge 24 at the front, but oriented along the downstream direction. Such a configuration also can benefit from skew effects related to aerodynamic forces that are applied in the upstream to downstream direction. The rotor element of the turbine, the nozzle root and the ledge are also provided with the same type of sealing pairs as pairs 20 and 30.

The invention claimed is:

1. A sealing system in a cavity under a stator sector of a turbomachine flow path, comprising a stator sector and a rotor device, the cavity being located between a root of a vane of the stator sector and the complementary rotor device,
  the root comprising a first surface provided at least partially with an abradable coating,
  the rotor device being provided with at least one first sealing element arranged facing the first surface, the first surface and the first sealing element forming a first sealing pair and delimiting a first leakage section between them,
  wherein:
  the root comprises a second surface provided at least partially with an abradable coating,
  the rotor device being provided with at least one second sealing element arranged facing the second surface, the second surface and the second sealing element forming a second sealing pair and delimiting a first leakage section between them,
  the first sealing pair tending towards a minimum leakage section when the second pair tends towards a corresponding maximum leakage section, and the first leakage pair tending towards a maximum leakage section when the second pair tends towards a minimum leakage section during an engine mission, the first and second sealing pairs being at an axial spacing from each other.

2. The sealing system according to claim 1, the first surface being an internal surface of the root and the second surface being an external surface of the root.

3. The sealing system according to claim 1, the first surface having a radius of curvature less than the radius of curvature of the second surface.

4. The sealing system according to claim 1, the second surface belonging to an axial wall projecting axially from a body of the root, such that the second surface is radially located under a platform of the rotor device, and the first surface being located on the body of the root while being at least partially overlapped radially by the platform of the sector.

5. The sealing system according to claim 1, the axial wall extending towards the upstream direction and the turbomachine flow path being a compressor flow path.

6. The sealing system according to claim 1, the axial wall extending towards the downstream direction and the flow path being a turbine flow path.

7. A turbomachine rotor device comprising at least one first sealing element extending towards the outside of the turbomachine and forming a first group of sealing elements, and at least one second sealing element facing the longitudinal axis of the turbomachine and forming a second group of sealing elements, the rotor device being configured to form a system according to claim 1 in combination with a stator sector, the first and the second group of sealing elements being at an axial spacing from each other.

8. The turbomachine stator sector comprising a vane having a root, the root of the vane comprising a first surface provided at least partially with an abradable coating and facing a longitudinal axis of the turbomachine, and a second surface provided at least partially with an abradable coating and facing the outside of the turbomachine, the stator sector being configured to form a sealing system according to claim 1 in combination with a rotor device, the abradable coating and the abradable coating being at an axial spacing from each other.

9. The turbomachine comprising a rotor device according to claim 7 and a stator sector, the rotor device and the stator sector jointly forming a sealing system.

\* \* \* \* \*